United States Patent [19]
Park

[11] Patent Number: 5,608,479
[45] Date of Patent: Mar. 4, 1997

[54] AUTOMATIC FILM WINDING/REWINDING DEVICE FOR PREVENTION OF FILM EXPOSURE TO LIGHT AND RELATED CONTROL METHOD

[75] Inventor: Eun-Gwan Park, Changwon-si, Rep. of Korea

[73] Assignee: Samsung Aerospace Industries, Ltd., Kyeongsangnam-do, Rep. of Korea

[21] Appl. No.: 585,729

[22] Filed: Jan. 16, 1996

[30] Foreign Application Priority Data

Jan. 13, 1995 [KR] Rep. of Korea .......................... 95-550

[51] Int. Cl.⁶ .............................. G03B 1/18; G03B 19/02; G03B 1/00
[52] U.S. Cl. ........................ 396/390; 396/413; 396/418; 396/410
[58] Field of Search .................................... 354/207, 214, 354/215, 173.1, 173.11

[56] References Cited

U.S. PATENT DOCUMENTS 4,299,466  11/1981  Harvey .................................. 354/173.1
4,435,061  3/1984  Fukahori et al. ................... 354/173.11
5,325,141  6/1994  Shiina et al. ......................... 354/173.1

*Primary Examiner*—Safet Metjahic
*Assistant Examiner*—Daniel Chapik
*Attorney, Agent, or Firm*—Finnegan, Henderson, Farabow, Garrett & Dunner, L.L.P.

[57] ABSTRACT

An automatic film winding/rewinding device and related control method for prevention of film exposure to light due to leaving non-rewound film in a camera for a long time or due to a operator mistakingly opening the back cover of the camera. In operation, the device automatically rewinds the film when the camera power switch is turned off for a long period of time. The device winds the film back to the next frame position when the camera is turned on so that the remaining film is fully utilized. Further, the device allows the film to be rewound if the back cover is opened. The device includes a film number sensor for sensing the perforation number of the film as the film is wound and produces an electric signal corresponding to the number of the perforation of the film.

18 Claims, 5 Drawing Sheets

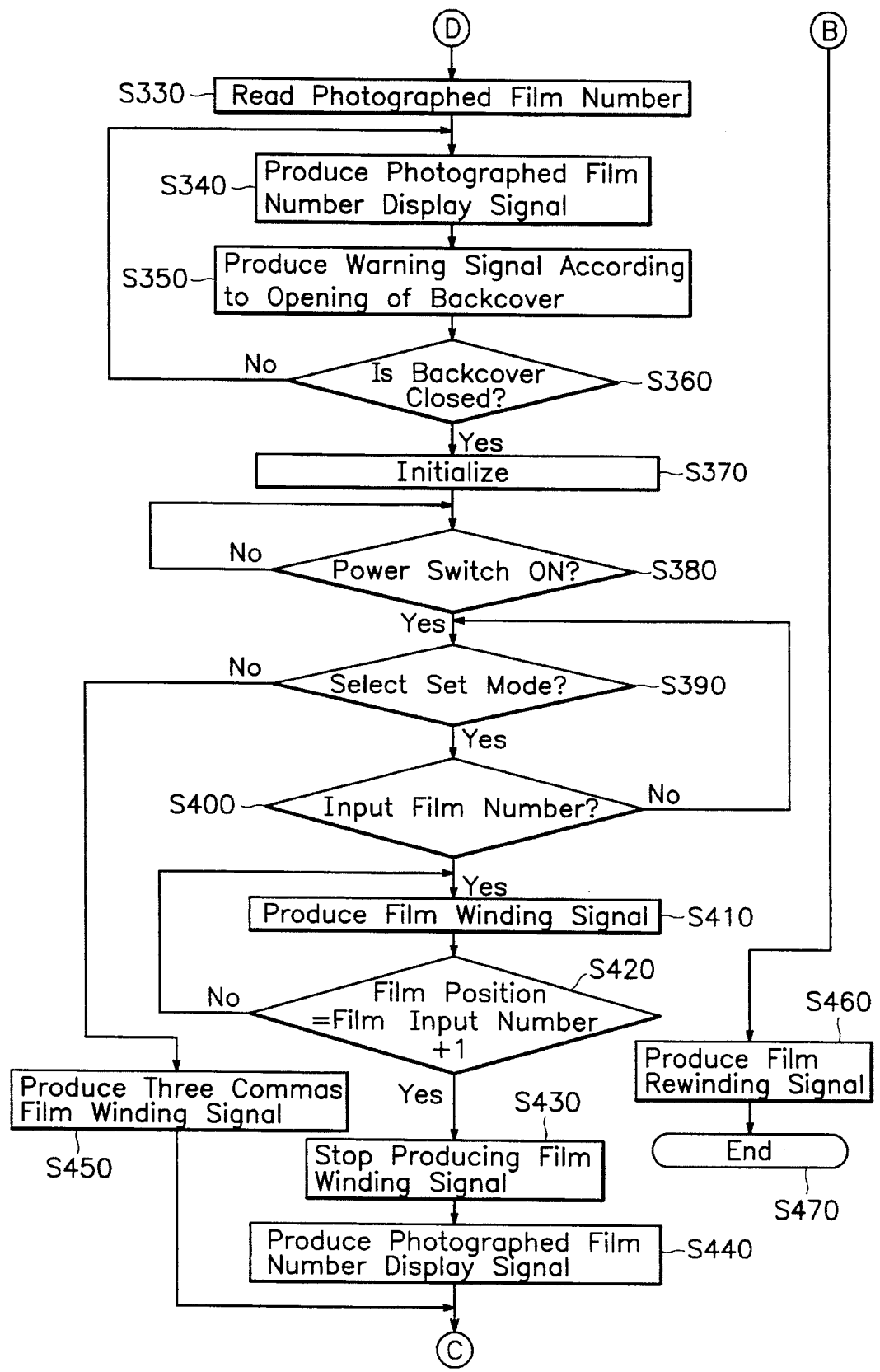

AUTOMATIC FILM WINDING/REWINDING DEVICE FOR PREVENTION OF FILM EXPOSURE TO LIGHT AND RELATED CONTROL METHOD

BACKGROUND OF THE INVENTION

1. Field of the Invention

The present invention relates generally to an automatic film winding/rewinding device and related control method for preventing film exposure to light. More particularly, this invention concerns an automatic film winding/rewinding device and related control method camera that prevents film loss due to exposure to light by automatically rewinding the film when the camera is not used for a predetermined period after the film is mounted in the camera and photographing is performed.

2. Description of the prior Art

Generally, in a conventional camera, film is rewound into a film patron only when all the mounted film is photographed or a operator operates a rewinding switch voluntarily.

However, the conventional camera has a disadvantage in that the film is gradually exposed to light when the camera is not being used. For example, the film is exposed to light leaking into the camera when the mounted film includes thirty-six frames, twenty-four of which have been used, and the camera is not being used while the film is mounted in the camera.

In addition, if a operator inadvertently opens a back cover of the camera without knowing that the film is mounted in the camera, all photographed film is damaged.

SUMMARY OF THE INVENTION

An object of the present invention is to provide a camera that overcomes the problems and disadvantages of the prior art by providing an automatic film winding/rewinding device and related control method for prevention of film exposure to light due to leaving non-rewound film in a camera for a long time or due to a operator mistakingly opening the back cover of the camera.

To achieve this and other objects and in accordance with the purpose of the invention, as embodied and broadly described herein, the automatic film winding/rewinding device for prevention of film exposure to light includes power switch means for applying power for performing photographing; control means for determining whether the camera power switch has been off for a predetermined time, and producing a film rewinding signal upon a determination that the camera power switch means has been off for a predetermined time; and film motor actuating means for performing winding/rewinding operation of the mounted film in response to a signal produced from said control means.

According to another aspect of the present invention, a method for controlling an automatic film winding/rewinding device for prevention of film exposure to light, includes the steps of taking a photograph according to a selection of the photographic operation by an operator; determining whether all the mounted film has been used for photographing after winding one frame of the mounted film; determining whether the camera is being used to take photographs by monitoring the state of the power switch; and if it is determined that the camera is not being used to take photographs, determining whether a predetermined time has elapsed, and if the predetermined time has elapsed, performing a film rewinding operation.

The objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings:

FIGS. 4A to 4C are flowcharts showing the operations of the camera of FIG. 1.

DESCRIPTION OF THE PREFERRED EMBODIMENT

Reference will now be made in detail to the preferred embodiment of the present invention, an example of which is illustrated in the accompanying drawings.

Figure 1:
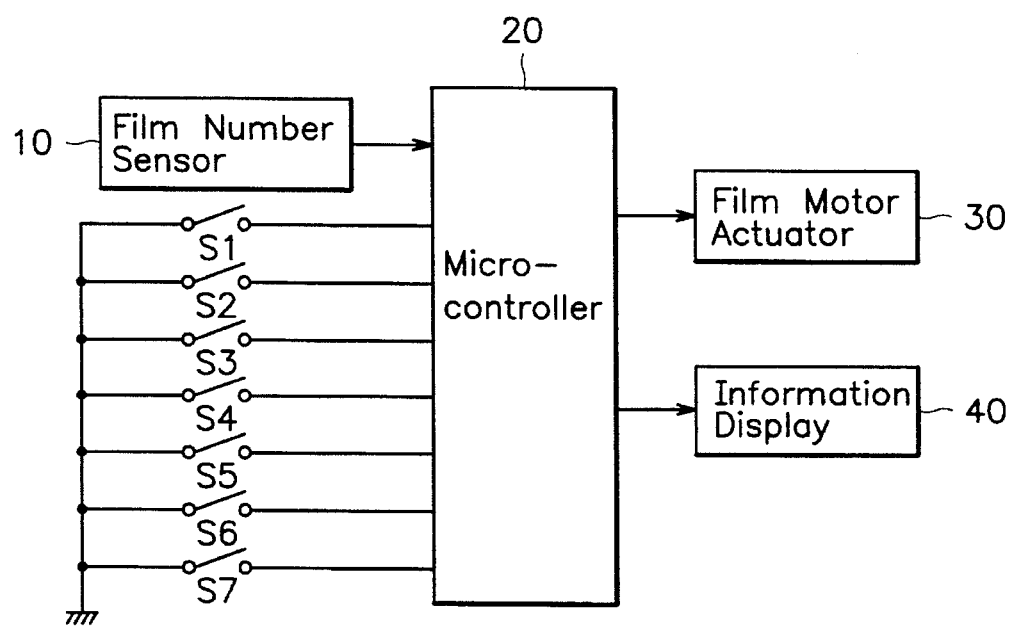
FIG. 1 is a block diagram illustrating a construction of an automatic film winding/rewinding device for prevention of film exposure to light according to a preferred embodiment of the present invention.

In FIG. 1, an automatic film winding/rewinding device for preventing film exposure to light is shown to include a film number sensor 10 for sensing the number of perforations of film mounted in a camera and producing an electric signal corresponding to the number of perforations; a power switch S1 for applying power to the camera according to photographic selection of users release switch S2 for performing photographing; a film rewinding switch S3; a film winding switch S4; a back cover switch S5 which changes state according to opening state of a back cover of the camera; a photographic mode selection switch S6; a film number input switch S7; a micro-controller 20 connected to output terminals of the film number sensor 10 and the switches S1 to S7.

The micro-controller 20 produces a film rewinding signal when a photograph is not taken for a predetermined time and produces a film winding signal for winding the film to a next position of the photographed film when the operator takes a photograph is again taken. A film motor actuator 30 connects to an output terminal of the micro-controller 20 and performs a winding/rewinding operation of the film mounted in the camera according to an applied film winding/rewinding signal and an information display 40 connects to the output terminal of the micro-controller 20.

Figure 2:
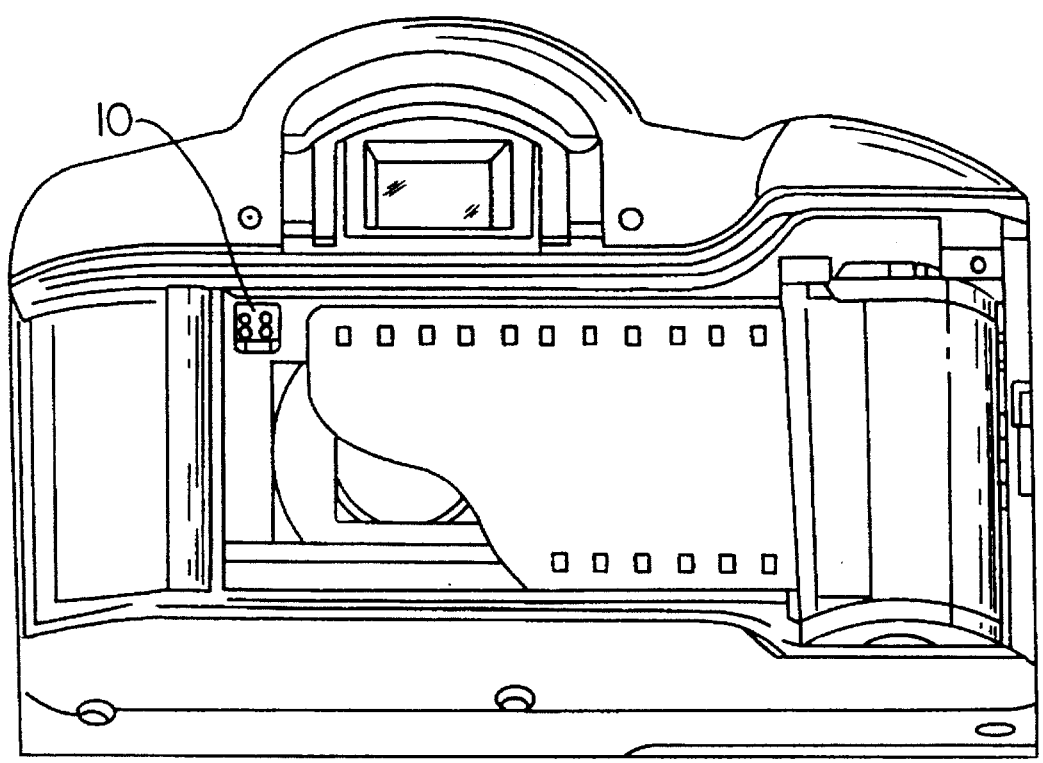
FIG. 2 is a view of a camera illustrating film mounted according to a preferred embodiment of the present invention.

Referring to FIG. 2, the film number sensor 10 is preferably a sensor having a light emitting section and a light receiving section for emitting light which is used to sense perforations on the film. Other alternatives, such as a sprocket switch, may be used.

In operation, film is automatically, or at an operator's request fed into a film patron when the film is expected to be left alone in the camera for a long time. However, the film is not entirely inserted into the film patron; a last part of the film remains on a rail surface of the camera body. The last part of the film is a lead part which is drawn out to a spool position before new film is mounted in the camera. The lead part of the film is required for raking up, or winding, the film by a rake of the spool to a position of the next unexposed frame in the film when photographing is again carried out.

The rewinding operation is carried out after a lapse of a predetermined time when the film has not been used or when the operator wants to prevent in advance damage to the film due to exposure to the minute light which leaks in the camera or due to exposure when opening the back cover.

An accurate positional setting of the film is maintained when winding or rewinding the film by the sensor 10. Sensor 10 senses the perforations in the film mounted on the surface of the rail of the back cover. This is accomplished by counting the perforations of the film sensed in the transfer of the film and controlling the film winding or rewinding operation to a corresponding position.

The operation of the automatic film winding/rewinding device for prevention of film exposure to light, according to the preferred embodiment of the present invention, will be now explained with reference to the accompanying drawings.

Figure 4A:
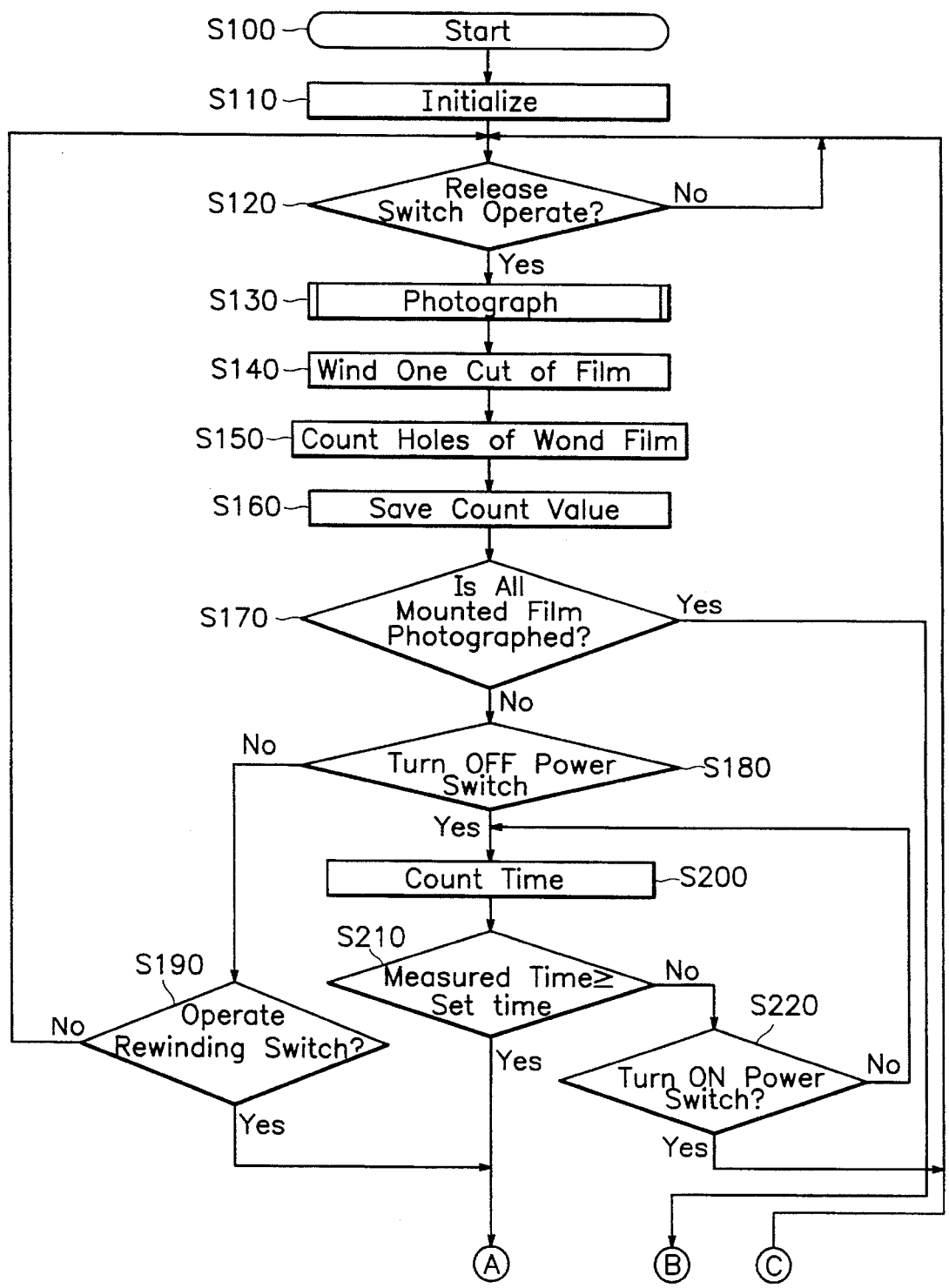
Figure 4B:
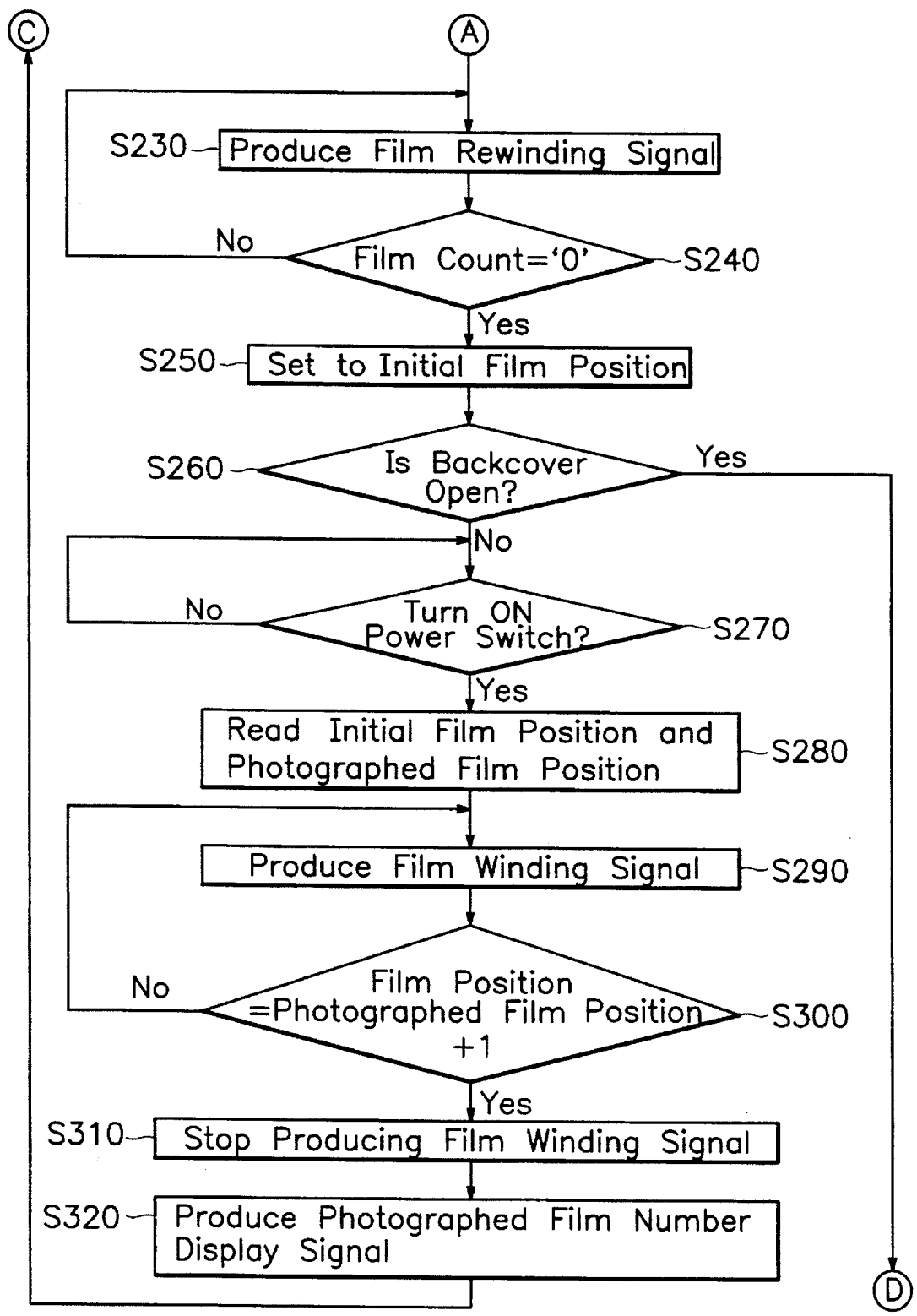

As depicted in FIGS. 4A to 4C, when power is applied to the camera, the micro-controller 20 initializes all the variables used for photographing in the winding/rewinding control routine (Step 110). Photographing is carried out according to a set photographic routine in response to a operator's photographic operation selection.

The micro-controller 20 determines whether the release switch S2 is operated (S120). When the release switch S2 is operated photographing is carried out according to a general photographic routine (Step 130) and the micro-controller 20 produces a signal for winding one frame of the film to be photographed (Step 140).

The film motor actuator 30, under control of the micro-controller 20, rotates and causes the film motor (not shown) to wind the film forward. Similarly, the film motor can be controlled by the micro-controller 20 to wind the film in reverse.

Figure 3:
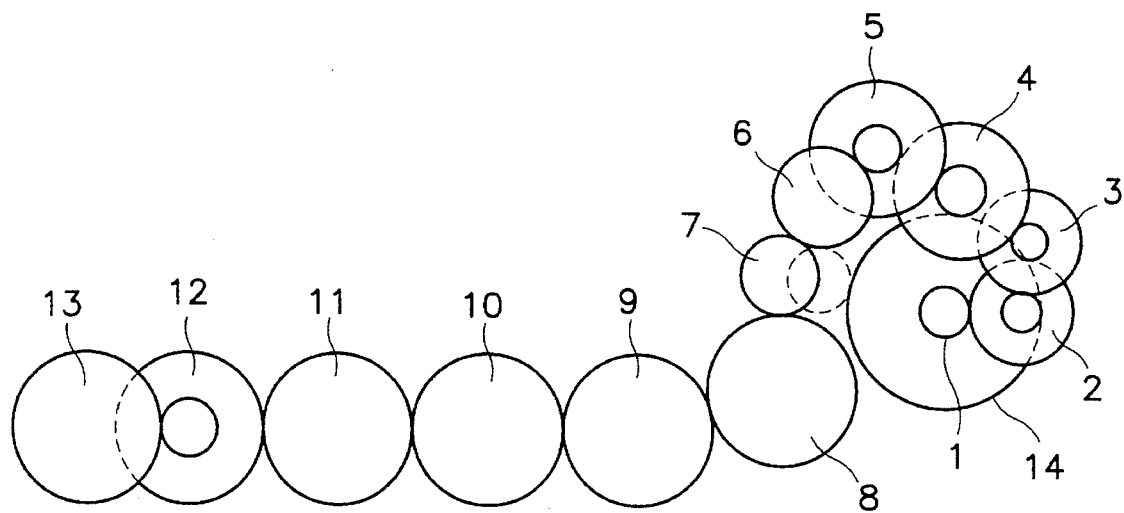
FIG. 3 illustrates a gear activated according to a film winding/rewinding operation according to a preferred embodiment of the present invention.

Referring to FIG. 3, as the film motor (not shown) rotates forward, a planet gear 7 contacts a spool gear 6 for winding the film in the spool 14. Power produced by the motor gear is transmitted to winding gears 2 through 6, and one frame of the photographed film is wound.

The micro-controller 20, via the film number sensor 10, senses and counts the number of film perforations as the film is winding. The film number sensor 10 produces an electric pulse signal when it detects a film perforation. The film number sensor 10 forwards the pulse signal to the micro-controller 20 which counts the perforations on the film transferred according to the pulse signal produced from the film number sensor 10 and stores a value thereof.

The micro-controller 20 counts the wound film and determines whether all the mounted film has been used (Step 170). When all the mounted film has been used, the micro-controller 20 produces a signal for rewinding the film, rewinds all the photographed film, and ends the operation (Steps 460 to 470).

If the power switch S1 is not turned OFF, the micro-controller 20 determines whether the operator has selected a rewinding mode (Step 190). When the operator selects the rewinding mode by operating the film rewinding switch S3, the micro-controller 20 produces the film rewinding signal, thereby rewinding the photographed film.

If all the mounted film has not been used, the micro-controller 20 determines whether the camera is in use by determining the operational state of the power switch S1 (Step 180). If the power switch is off, the micro-controller 20 starts counting elapsed time to determine when a set time has elapsed (Step 200).

The micro-controller 20 compares the elapsed time against the predetermined set time instep 210. If the power switch S1 is turned on during the counting of the elapsed time, control returns to step S120 (Step S220). When the time counted in the state that the power switch S1 is turned OFF is over a predetermined set time, the micro-controller 20 produces the film rewinding signal according to the photographic routine illustrated in FIG. 4B to prevent the exposure to the minute light due to leaving alone of the film for a long time (Step 230).

The film motor actuator 30 rotates the film motor (not shown) rearward in response to the film rewinding signal produced from the micro-controller 20. The planet gear 7 illustrated in FIG. 3 contacts a gear 8, thereby rotating the rewinding gear groups 8 to 13 making the mounted film rewind.

The micro-controller 20 determines whether all the film is rewound in response to a signal sensed by the film number sensor 10 after producing the film rewinding signal (Step 240). When all the film is rewound, the micro-controller 20 stores the initial position of the film before it was rewound (Step 250).

Next, the micro-controller 20 determines whether the back cover has been opened (Step 260), based on the state of the back cover switch S5. If the micro-controller 20 determines that the back cover switch is closed, step 270 is executed, in which the micro-controller 20 waits for the power switch to be turned on.

If the back cover is not open, the micro-controller waits for the power to be turned on in step 270. When the power switch is turned on, the micro-controller 20 reads the initial position of the film and the position of the last photograph (Step 280) and produces the film winding signal (Step 290).

The film motor actuator 30 is operated in response to the film winding signal and the mounted film is wound to the last photographed film position plus one (Step 300). The micro-controller 20 suspends producing the film winding signal when the sensed film perforation count is equal to the position of the film perforation corresponding to the position of the photographed film plus one. In step 320, the micro-controller 20 produces an information signal describing the photographed film number to the information display 40 (Step 320). The operation state of the information display 40 is varied in response to the signal applied from the micro-controller 20, and displays to the operator how many photographs have been taken.

In step 260, if the operator mistakenly opens the back cover of the camera without being aware that the photographed film is mounted, step 330 is executed. Then, the photograph film number is displayed and a warning signal is sounded until the back cover is closed (Steps 340, 350, and 360).

When the back cover is closed, the micro-controller waits for the power switch S1 to be turned on. If the camera power is not turned on for a predetermined period of time, the micro-controller 20 may initiate the film rewinding signal as shown in steps 210, 230, 240, and 250.

If the operator opens the back cover of the camera the photographed film frame number and the warning signal are displayed. The operator may determine that the initialization is made in response to the opening/closing operation of the back cover of the camera despite the photographed film being presently mounted. Then, the operator sets the mode for carrying out the film winding according to the displayed film number by operating the photographic mode switch S6.

When the film winding mode according to the number of the film is selected in response to the operation of the photographic mode switch S6, the micro-controller 20 determines the film number input for winding the film (Step 400).

When the operator inputs the displayed photographed film number by operating the film number input switch S7, the micro-controller 20 produces the film winding signal, and winds the film to a position of the inputted film number plus one (Steps 410 to 430).

The micro-controller 20 displays the number of the film presently photographed by operating the information display 40 after winding the film to the position of the inputted film number plus one, and performs the photographing according to whether the release switch S2 is operated.

The micro-controller 20 advances the film by more than one frame to perform the initial winding according to the film mounting when the mode for winding the film according to the displayed film number is not selected (Step 450).

As described above, the effect of the automatic film winding/rewinding device of the present invention, for prevention of film exposure to light, lies in that the exposure to light due to of the film being left dormant for a long time, and damage to the film due to the opening of the back cover, can be prevented by winding the film to the next position when photographing is again initiated. Because the film is automatically rewound when the operator leaves the camera alone for a long time without using the camera, the remaining film can be fully utilized.

Another effect of the automatic film winding/rewinding device for prevention of film exposure to light of the present invention lies in that the damage to the film due to the initialization of the camera when the photographed film is mounted is avoided. This is possible because the operator can input the photographed film number in response to a display of the photographed film number whereby the winding of the film to the inputted film number is carried out despite the operator mistakingly opening the back cover of the camera.

Other embodiments of the invention will be apparent to those skilled in the art from consideration of the specification and practice of the invention disclosed herein. It is intended that the specification and examples can be considered as exemplary only, with a true scope and spirit of the invention being indicated by the following claims.

What is claimed is:

1. An automatic film winding/rewinding device for prevention of film exposure to light in a camera, comprising:

film number sensing means for sensing perforations on the film as the film is wound and for counting the number of perforations;

power switch means for applying power for performing photographing when selected by a user;

control means for determining whether all the film mounted in the camera has been used for photographing and whether the camera power switch has been off for a predetermined time, and producing a film rewinding signal upon a determination that the camera power switch means has been off for a predetermined time or that all the film mounted in the camera has been used in a photographing operation; and film motor actuating means for performing winding/rewinding operation of the mounted film in response to a signal produced from said control means.

2. The automatic film winding/rewinding device of claim 1, wherein said control means produces a signal for winding the film from a rewound position to a next available film frame if said power switch means is turned on.

3. The automatic film winding/rewinding device of claim 1, wherein said control means rewinds the film to a leading end of a spool in rewinding the film.

4. The automatic film winding/rewinding device of claim 1, further comprising information displaying means with a varying operational state according to a signal from said control means for displaying the operation state of the camera to the operator; and a back cover switch that has an operational state controlled according to opening and closing a back cover of the camera.

5. The automatic film winding/rewinding device of claim 1, wherein said control means produces an information signal for informing the operator of a number of the photographed film among the presently mounted film in the camera when the power switch is operated after rewinding of the film and the film winding operation is made from a position of the previously photographed film to a next frame.

6. The automatic film winding/rewinding device of claim 4, wherein said control means produces an information signal for displaying a number of a next available film frame among the presently mounted film in the camera when the film is rewound.

7. The automatic film winding/rewinding device of claim 6, further comprising a photographic mode switch for setting a photographic mode for taking a photograph by winding the film to the displayed film number when the operator performs the opening and closing operation of the back cover and the back cover switch is turned ON/OFF; and a film number input switch for inputting the number of the film for winding the film in response to the operation of the photographic mode switch.

8. The automatic film winding/rewinding device of claim 7, wherein said control means determines whether a film winding mode is set by the number of the photographed film in response to the operation of the photographic mode switch if the operator opens the back cover and the data is initialized, and produces a signal for winding the film from the film number inputted in response to the operation of a film number input switch to a next frame when the film winding mode is set by the number of the photographed film.

9. The automatic film winding/rewinding device for prevention of film exposure to light of claim 1, wherein said film number sensing means includes an optical sensor having a light emitting section for emitting light and a light receiving section for sensing the light, and senses perforations on the film as the film is winding/rewinding.

10. A method for controlling an automatic film winding/rewinding device for prevention of exposure to light on mounted film, comprising the steps of:

taking a photograph according to a selection of the photographic operation by an operator;

determining whether all the mounted film has been used for photographing after winding one frame of the mounted film;

determining whether the camera is being used to take photographs by monitoring the state of the power switch; and if it is determined that the camera is not being used to take photographs, determining whether a predetermined time has elapsed, and if the predetermined time has elapsed, performing a film rewinding operation.

11. The method according to claim 10, wherein the step of performing the film rewinding operation when the camera is not used for the predetermined time further includes a step of winding the film to a frame after the previously photographed film position when the power switch is operated to use the camera again.

12. The method according to claim 11, further comprising:

displaying a number of the photographed film frame among the presently mounted film after winding the film.

13. The method according to claim 10, wherein the step of performing the rewinding operation after the predetermined time elapses includes a step of rewinding the film to a leading end of a spool.

14. The method according to claim 10, wherein the step of performing the film rewinding operation after the predetermined time elapses further includes a step of displaying a number indicating how many film frames have been used on the presently mounted film when the operator opens the back cover and the back cover switch is operated.

15. The method according to claim 14, further comprising:

determining whether a film winding mode is set by the number of the photographed film frames in response to operation of a photographic mode switch if the operator opens the back cover, and winding the film from the film number inputted in response to the operation of a film number input switch to a next frame when the film winding mode is set by the number of the photographed film.

16. An automatic film winding/rewinding device for prevention of film exposure to light in a camera, comprising:

power switch means for applying power for performing photographing when selected by a user;

control means for determining whether the camera power switch has been off for a predetermined time, and producing a film rewinding signal upon a determination that the camera power switch means has been off for a predetermined time; and film motor actuating means for performing winding/rewinding operation of the mounted film in response to a signal produced from said control means.

17. The automatic film winding/rewinding device of claim 16, wherein said control means includes means for producing a signal for winding the film from a rewound position to a next available film frame when said power switch means is turned on.

18. The automatic film winding/rewinding device of claim 16, wherein said film motor activating means includes means for rewinding the film to a leading end of a spool in response to said film rewinding signal.

* * * * *